US008909941B1

(12) United States Patent
Trimberger

(10) Patent No.: US 8,909,941 B1
(45) Date of Patent: Dec. 9, 2014

(54) PROGRAMMABLE INTEGRATED CIRCUIT AND A METHOD OF ENABLING THE DETECTION OF TAMPERING WITH DATA PROVIDED TO A PROGRAMMABLE INTEGRATED CIRCUIT

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 159 days.

(21) Appl. No.: 13/077,814

(22) Filed: Mar. 31, 2011

(51) Int. Cl.
*G06F 21/00* (2013.01)

(52) U.S. Cl.
USPC .............................. 713/193; 713/190; 726/30

(58) Field of Classification Search
USPC .............. 173/193–194; 713/193, 190; 726/30
See application file for complete search history.

(56) References Cited

U.S. PATENT DOCUMENTS

| | | | |
|---|---|---|---|
| 5,406,627 A * | 4/1995 | Thompson et al. ............ 380/237 |
| 5,457,408 A | 10/1995 | Leung | |
| 5,598,424 A | 1/1997 | Erickson et al. | |
| 5,668,947 A * | 9/1997 | Batcher ............................ 714/30 |
| 5,802,003 A | 9/1998 | Iadanza et al. | |
| 5,892,961 A | 4/1999 | Trimberger | |
| 6,105,105 A | 8/2000 | Trimberger | |
| 6,181,164 B1 | 1/2001 | Miller | |
| 6,188,766 B1 | 2/2001 | Kocher | |
| 6,191,614 B1 | 2/2001 | Schultz et al. | |
| 6,278,783 B1 | 8/2001 | Kocher et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,381,699 B2 | 4/2002 | Kocher et al. | |
| 6,429,682 B1 * | 8/2002 | Schultz et al. ................. 326/41 |
| 6,510,518 B1 | 1/2003 | Jaffe et al. | |
| 6,539,092 B1 | 3/2003 | Kocher | |
| 6,640,305 B2 | 10/2003 | Kocher et al. | |
| 6,654,884 B2 | 11/2003 | Jaffe et al. | |
| 6,654,889 B1 | 11/2003 | Trimberger | |
| 6,731,536 B1 * | 5/2004 | McClain et al. ......... 365/185.04 |
| 6,839,774 B1 | 1/2005 | Ahn et al. | |
| 6,894,527 B1 | 5/2005 | Donlin et al. | |
| 6,978,370 B1 | 12/2005 | Kocher | |
| 7,039,816 B2 | 5/2006 | Kocher et al. | |
| 7,064,577 B1 | 6/2006 | Lee | |
| 7,162,644 B1 | 1/2007 | Trimberger | |
| 7,200,235 B1 * | 4/2007 | Trimberger ................... 380/277 |
| 7,254,800 B1 | 8/2007 | Trimberger | |
| 7,373,668 B1 | 5/2008 | Trimberger | |
| 7,401,258 B1 | 7/2008 | Fang et al. | |
| 7,506,165 B2 | 3/2009 | Kocher et al. | |
| 7,535,249 B1 | 5/2009 | Knapp | |
| 7,539,926 B1 | 5/2009 | Lesea | |
| 7,546,441 B1 | 6/2009 | Ansari et al. | |

(Continued)

OTHER PUBLICATIONS

U.S. Appl. No. 12/791,668, filed Jun. 1, 2010, Stephen M. Trimberger, XILINX, Inc., 2100 Logic Drive, SJ, CA US.

(Continued)

*Primary Examiner* — Michael Pyzocha
(74) *Attorney, Agent, or Firm* — John J. King

(57) ABSTRACT

A method of enabling detection of tampering with data provided to a programmable integrated circuit is described. The method comprises modifying a portion of the data to establish randomness in the data; and inserting, by a computer, a redundancy check value in the portion, wherein the redundancy check value is based upon the modified portion of the data. A programmable integrated circuit is also described.

11 Claims, 11 Drawing Sheets

(56) References Cited

U.S. PATENT DOCUMENTS

| | | |
|---|---|---|
| 7,587,044 B2 | 9/2009 | Kocher et al. |
| 7,599,488 B2 | 10/2009 | Kocher et al. |
| 7,606,362 B1 | 10/2009 | Streicher et al. |
| 7,634,083 B2 | 12/2009 | Kocher et al. |
| 7,668,310 B2 | 2/2010 | Kocher et al. |
| 7,681,233 B1 | 3/2010 | Fox et al. |
| 7,787,620 B2 | 8/2010 | Kocher et al. |
| 7,792,287 B2 | 9/2010 | Kocher et al. |
| 7,966,534 B1 | 6/2011 | Jacobson |
| 7,984,292 B1 | 7/2011 | Streicher et al. |
| 8,539,254 B1 | 9/2013 | Bridgford et al. |
| 2001/0002486 A1 | 5/2001 | Kocher et al. |
| 2001/0015919 A1 | 8/2001 | Kean |
| 2001/0025337 A1* | 9/2001 | Worrell et al. ............ 712/209 |
| 2001/0037458 A1* | 11/2001 | Kean ............... 713/193 |
| 2001/0053220 A1 | 12/2001 | Kocher et al. |
| 2002/0099948 A1 | 7/2002 | Kocher et al. |
| 2003/0028771 A1 | 2/2003 | Kocher et al. |
| 2004/0162989 A1* | 8/2004 | Kirovski ............... 713/189 |
| 2006/0136723 A1 | 6/2006 | Taylor |
| 2007/0033419 A1 | 2/2007 | Kocher et al. |
| 2007/0038984 A1* | 2/2007 | Gschwind et al. ........... 717/136 |
| 2008/0037781 A1 | 2/2008 | Kocher et al. |
| 2008/0049935 A1 | 2/2008 | Kocher et al. |
| 2008/0101604 A1 | 5/2008 | Kocher et al. |
| 2008/0130886 A1 | 6/2008 | Kocher et al. |
| 2008/0133938 A1 | 6/2008 | Kocher et al. |
| 2008/0137848 A1 | 6/2008 | Kocher et al. |
| 2008/0279369 A1* | 11/2008 | Palmer ............... 380/28 |
| 2010/0205461 A1* | 8/2010 | Satou et al. ............ 713/193 |
| 2010/0287359 A1* | 11/2010 | Norden ............... 712/210 |
| 2011/0320855 A1* | 12/2011 | Ambroladze et al. ............ 714/2 |

OTHER PUBLICATIONS

XILINX, Inc., "Virtex-6 FPGA Configuration", User Guide, UG360 v3.2, Nov. 1, 2010, pp. 1-180, XILINX, Inc., 2100 Logic Drive, SJ, CA US.

Xilinx, Inc. "Virtex-5 FPGA Configuration User Guide", UG191 (v3.9.1) Aug. 20, 2010, Chapter 6, pp. 1-166, www.xilinx.com, Xilinx, Inc., 2100 Logic Drive, San Jose, CA, US.

Badrignans, B., et al., "Secure FPGA configuration architecture preventing system downgrade", Field Programmable Logic and Applications, 2008, FPL 2008, International Conference on, pp. 317-322, Sep. 8-10, 2008.

Drimer, Saar, "Authentication of FPGA Bitstreams: Why and How," Reconfigurable Computing: Architectures, Tools and Applications, Lecture Notes in Computer Science, 2007, Springer Berlin/Heidelberg, vol. 4419, pp. 73-84.

Fong, R.J., et al., "A versatile framework for FPGA field updates: an application of partial self-reconfiguration," Rapid Systems Prototyping, 2003, Proceedings, 14$^{th}$ IEEE International Workshop on, pp. 117-123, Jun. 9-11, 2003.

Galla, T.M., et al., "Control Flow Monitoring for a Time-Triggered Communication Controller," 10$^{th}$ European Workshop on Dependable Computing (EWDC-10), Schriftenreihe der Osterreichischen Computer Gesellschaft, Vienna, 1999, pp. 43-48.

Hori, Y., et al., "Bitstream Encryption and Authentication Using AES-GCM in Dynamically Reconfigurable Systems", Advances in Information and Computer Security, Lecture Notes in Computer Science, 2008 Springer Berlin/Heidelberg, pp. 261-278, vol. 5312.

Trimberger, S., "Trusted Design in FPGAs," Design Automation Conference, 2007 DAC '07, 44$^{th}$ ACM/IEEE, pp. 5-8, Jun. 4-8, 2007.

Xilinx, *Virtex-6 FPGA Configuration*, UG360 v3.0, Jan. 8, 2010, pp. 1-174,in particular pp. 94-98 and 103-166, Xilinx, Inc., San Jose, California, USA.

* cited by examiner

PROGRAMMABLE INTEGRATED CIRCUIT AND A METHOD OF ENABLING THE DETECTION OF TAMPERING WITH DATA PROVIDED TO A PROGRAMMABLE INTEGRATED CIRCUIT

FIELD OF THE INVENTION

An embodiment relates generally to integrated circuit devices, and in particular to a method of enabling the detection of tampering with data provided to a programmable integrated circuit.

BACKGROUND

Data is often provided to electronic systems to enable the electronic systems to function. In some integrated circuit devices, the data may be used to program the integrated circuit to enable a circuit to function as desired by a user. For example, the data may be data for configuring an integrated circuit device having programmable resources. Developing the data for configuring an integrated circuit device having programmable resources may take significant time and resources, and therefore may be costly. Accordingly, fraudulent third parties may be interested in intercepting the data and using the data without compensating the owner of the data. In other circumstances, adversaries may be interested in altering data coupled to an integrated circuit to impair the integrated circuit or the device implementing the integrated circuit.

While efforts have been made to eliminate the problem of tampering with data adapted to program integrated circuit devices, these efforts have had significant limitations. For example, it may be possible to tamper with data of a bitstream before an authentication tag is checked. Further, the transmission of data to a device may be controlled by a predetermined data transfer protocol. Therefore, any modification to the data stream which enables detecting any tampering must conform to the data transfer protocol. Accordingly, implementing a method of detecting the tampering with data provides significant challenges.

SUMMARY OF THE INVENTION

A method of enabling detection of tampering with data provided to a programmable integrated circuit is described. The method comprises modifying a portion of the data to establish randomness in the data; and inserting, by a computer, a redundancy check value in the portion, wherein the redundancy check value is based upon the modified portion of the data.

Modifying a portion of the data may comprise inserting random bits in locations which are unused. Inserting random bits in locations which are unused may comprise inserting random bits selected from the group consisting of random bits generated by a random number generator, random bits generated by a proprietary algorithm, and random bits generated from a cyclic redundancy check of predetermined bits of the data. The method may further comprise performing, by the programmable integrated circuit, error detection using the redundancy check value. Performing error detection may comprise performing error detection for each instruction of a plurality of instructions in the data. Performing error detection may comprise performing error detection in response to an instruction to perform a redundancy check inserted in a plurality of instructions in the data. The method may further comprise encrypting the data.

According to an alternate embodiment, a method of enabling the detection of tampering with data provided to a programmable integrated circuit comprises establishing multiple encoded values for a portion of the data; selecting one of the multiple encoded values; and generating, by a computer, a bitstream having the selected encoded value for configuring the programmable integrated circuit.

Establishing multiple encoded values for a portion of the data according to the alternate embodiment may comprise establishing multiple encoded values for a field of an instruction. Selecting one of the multiple encoded values may comprise selecting one of the multiple encoded values at random. Establishing multiple encoded values for a portion of the data may comprise establishing multiple encoded values for an operational code of an instruction. Establishing multiple encoded values for a portion of the data may comprise establishing multiple encoded values for a write instruction, wherein one encoded value of the multiple encoded values indicates that data associated with the write instruction is encoded. Establishing multiple encoded values for a portion of the data may comprise allowing multiple addresses of an address field to map to a given register. The method may further comprise inserting an error code value in an error code field of the instruction, wherein the error code value is based upon the selected encoded value.

A programmable integrated circuit is also disclosed. The programmable integrated circuit may comprise an input/output port adapted to receive bits for configuring the programmable integrated circuit, wherein the bits comprise random bits; a configuration controller coupled to receive the bits for configuring the programmable integrated circuit; and programmable resources coupled to the configuration controller, the programmable resources being configured in response to the bits received by the configuration controller, wherein the configuration controller processes the random bits according to a predetermined protocol.

The predetermined protocol may enable ignoring random bits or enable decoding multiple encoded values for a given instruction. The multiple encoded values for a given instruction may comprise multiple encoded values for an opcode. The programmable integrated circuit may further comprise encoding a field of the instruction based upon a selected encoded value of the multiple encoded values. The programmable integrated circuit may further comprise encoding data associated with an instruction based upon a selected encoded value of the multiple encoded values.

DETAILED DESCRIPTION OF THE DRAWINGS

Figure 1:
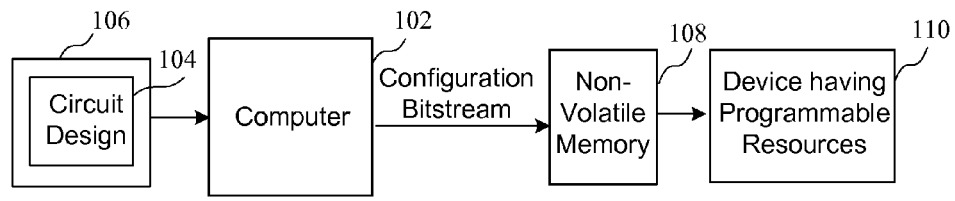
FIG. 1 is a block diagram of a system for programming a device having programmable resources according to an embodiment.

Turning first to FIG. 1, a block diagram of a system for configuring a programmable integrated circuit device having programmable resources according to an embodiment is shown. In particular, a computer 102 is coupled to receive a circuit design 104 from a memory 106, and generate a configuration bitstream which is stored in the non-volatile memory 108. As will be described in more detail below, the circuit design may be a high level design, such as a circuit design defined in a hardware description language (HDL). Also, the computer may be configured to run software that generates a configuration bitstream which is stored in the non-volatile memory 108 and then provided to a device 110 having programmable resources. As will be described in more detail below, the computer 102 enables modifying a portion of the data to establish randomness in the data or establish multiple encoded values for a portion of the data to generate a configuration bitstream.

The software flow for a circuit design to be implemented in a programmable integrated circuit comprises synthesis, packing, placement and routing, as is well known in the art. Synthesis comprises the step of converting a circuit design in a high level design to a configuration of elements found in the programmable integrated circuit. For example, a synthesis tool operated by the computer 102 may implement the portions of a circuit design implementing certain functions in configurable logic blocks (CLBs) or digital signal processing (DSP) blocks, for example. An example of a synthesis tool is the ISE® tool available from Xilinx®, Inc. of San Jose, Calif. Packing comprises the step of grouping portions of the circuit design into defined blocks of the device, such as CLBs. Placing comprises the step of determining the location of the blocks of the device defined during the packing step. Finally, routing comprises selecting paths of interconnect elements, such as programmable interconnects, in a programmable integrated circuit. At the end of place and route, all functions, positions and connections are known, and a configuration bitstream is then created. The bitstream may be created by a software module called BitGen available from Xilinx®, Inc. of San Jose, Calif. The bitstream may also be encrypted according to a predetermined encryption standard. The bitstream is either downloaded by way of a cable or programmed into an EPROM for delivery to the programmable integrated circuit. If encoded, the bitstream is then decoded by the programmable integrated circuit according to the predetermined encryption standard.

Figure 2:
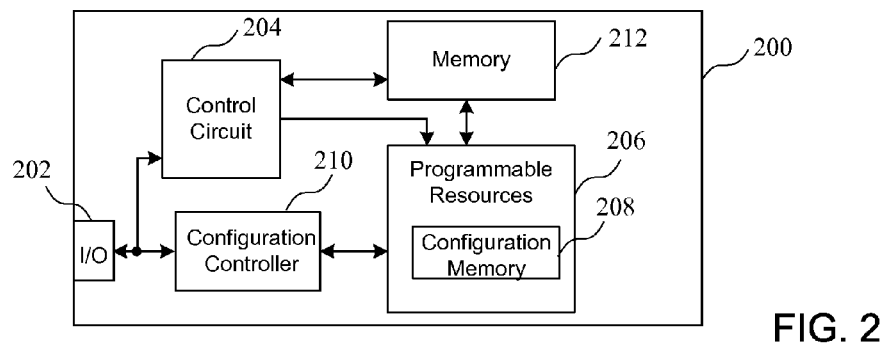
FIG. 2 is a block diagram of an integrated circuit having elements for configuring programmable resources according to an embodiment.

Turning now to FIG. 2, a block diagram of an integrated circuit having elements for configuring programmable resources according to an embodiment is shown. The circuit of FIG. 2 is implemented in an integrated circuit 200 having an input/output (I/O) port 202 coupled to a control circuit 204 and programmable resources 206. The programmable resources 206 include circuit elements which are configurable by a user of the circuit to implement a circuit design of the user's choice. As will be described in more detail below, the programmable resources 206 may include programmable logic, such as the programmable logic described in reference to FIGS. 8 and 9.

The circuits implemented in the programmable resources 206 may be implemented according to configuration bitstream downloaded to the integrated circuit 200. As will be described in more detail below, the programmable resources 206 include configuration memory 208. Generally, configuration memory 208 includes memory cells for configuring the programmable resources 206 based upon configuration bits of the configuration bitstream. Although a single block of programmable resources 206 and configuration memory 208 is shown, a given integrated circuit may include a plurality of blocks having programmable resources controlled by configuration memory. Also, the integrated circuit 200 may include a memory 212, such as a non-volatile memory external to the programmable resources 206, for storing configuration data.

A configuration controller 210 may be implemented, as a part of or separate from the control circuit 204, to load the configuration data into the configuration memory 208. The configuration data may be loaded directly by the configuration controller 210 by way of the I/O port 202, or by way of the control circuit 204 and the memory 212. The circuit of FIG. 2 may be any device having programmable resources 206, such as a programmable logic device as described below, or an application-specific integrated circuit (ASIC) having a portion of circuits which is programmable or memory for storing sensitive data. The circuit of FIG. 2 could be the device 110 having programmable resources, for example.

Figure 3:
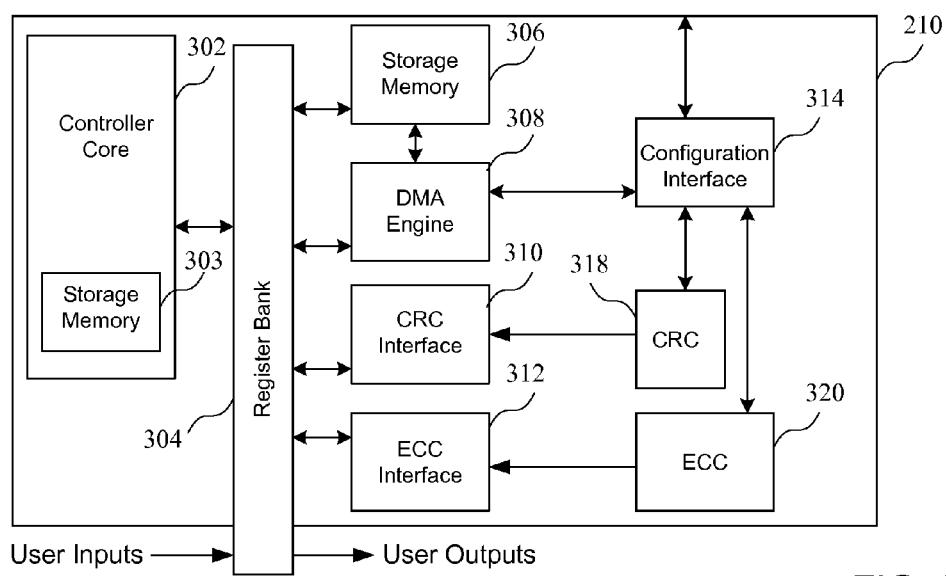
FIG. 3 is a block diagram of the configuration controller 210 of FIG. 2 according to an embodiment.

Turning now to FIG. 3, a block diagram of the configuration controller 210 of FIG. 2 according to an embodiment is shown. The configuration controller 210 enables error correction and detection. One area for error detection is when loading a bitstream into a programmable integrated circuit, where a cyclic redundancy check (CRC) on the entire bitstream is included to enable catching a data transmission error. Because it may be desirable that the check be simple and quick, typically data transmission errors are not corrected. Another area is while operating the programmable integrated circuit, where error detection and correction may be used to reduce problems from Single-Event Upsets (SEUs) caused by cosmic rays, for example. During operation, error detection and correction are deployed for an operating bitstream by reading the configuration data back from memory, and correcting any errors whenever possible. While it is generally assumed that the defective bits are random and not caused by malicious conduct, someone could alter portions of the bitstream, such as an instruction, and also alter the CRC so the FPGA would accept the altered bitstream.

The circuits and methods for generating randomness in a bistream set forth below find particular application in catching a data transmission error, including an attempt by an adversary to change data of a bitstream. When using encryption for a bitstream, the CRC is still computed on the decrypted data. Since attempts to alter an encrypted bitstream changes the decrypted data in unpredictable ways, this method catches malicious tampering with the bitstream. For example, an adversary would have to try $2^{32}$ different CRC values to guess the right one for the FPGA to accept the altered bits.

However, some authentication protocols have loopholes which may enable tampering with a bitstream. When authentication for an entire bitstream is used, such as Secure Hash Algorith (SHA) Hash Message Authentication Code (HMAC) authentication, a very large (e.g. 256-bit) code is computed on the entire bitstream. While an adversary has to try $2^{256}$ values to get the SHA HMAC to pass, a user may be able to alter the bitstream before the HMAC is checked. For example, the instructions in the bitstream get executed immediately after decryption. That is, it is not necessary to wait until the HMAC is checked. Further, one may desire to use a block cipher mode such as a Galois Counter Mode (GCM), where a change in the encrypted bitstream has a predictable change in the decrypted data. For example, in GCM and Cipher Feed Back (CFB) mode, data is encrypted by exclusive-ORing it with a pseudo-random stream of bits from the encryptor block. Because exclusive-OR is used, any change in the encrypted data, flips the corresponding bit in the decrypted data. This is termed a "bit-flipping" attack. If an adversary knows the decrypted data, he can modify that data using bit-flipping to be anything he wishes. If the data is actually an instruction, an adversary can cause the device to execute that instruction. Introducing randomness in a bitstream (i.e. introducing data in the bitstream which an adversary could not know) prevents manipulation, so that any undesirable changes to the encrypted data have unpredictable effects on a local CRC (or other redundant data) that can be checked before the instruction is executed.

The configuration controller 210 includes a controller core 302 having a storage memory 303 coupled to a register bank 304. As will be described in more detail below, the storage memory 303 may be a block of random access memory (BRAM). A separate storage memory 306, which may also be a BRAM, is coupled to the register bank 304 and a direct memory access (DMA) engine 308. The register bank is also coupled to a CRC Interface 310 and an error correction code (ECC) interface 312. The DMA engine 308 is coupled to a configuration interface 314 which interfaces with configuration memory, such as configuration memory 208 of FIG. 2, to enable loading and reading back of configuration data stored in the integrated circuit 100. The configuration interface also provides an interface to a CRC circuit 318 enabling a CRC of data and an ECC circuit 320 enabling ECC error detection, each of which will be described in more detail below.

The configuration interface 314 enables both reading data back in order to generate check bits, as well as writing the correct data of a frame which was determined to be erroneous back to the memory. As each frame is read back from the configuration memory 208, the configuration controller 210 keeps track of the frame address and stores the frame of data received by way of the configuration interface in the storage memory 303. In the event of an error, the controller core 302 uses the output of the ECC circuit 320 to determine whether an error is a single-bit or a double-bit error. In the event of a single-bit error, a syndrome generated by the ECC circuit 320 can be used to repair the errors of the stored data. The repaired data can then be written back through configuration interface to the configuration memory 208.

The register bank 304 provides an interface between the controller core 302 and the rest of the configuration controller 210. The register bank 304 allows the controller core 302 to access inputs and outputs of the integrated circuit, as well as to control the DMA engine 308 that is responsible for managing the flow of configuration data by way of the configuration interface 314. The register bank 304 also provides controller core 302 access to the CRC circuit 318 by way of the CRC interface 310 and access by the controller core 302 to the ECC circuit 320 by way of the ECC interface. The elements of FIG. 3 may be implemented in various arrangements of hard-wired circuits and circuits implemented in programmable resources. For example, storage memories 303 and 306 enabling the various embodiments may be BRAMs if implemented in programmable resources, and a configuration interface may be an internal configuration access port (ICAP) interface if implemented in programmable resources. In some embodiments, the entire configuration controller 210 is implemented in hard-wired circuits. Because the circuits and methods of the various embodiments are intended to prevent tampering with data, the circuits which enable detecting tampering are preferably implemented in hard-wired circuits to prevent tampering with those circuits. That is, an additional measure to prevent an adversary from tampering with data is to ensure that the adversary is not able to tamper with any circuit elements which are implemented to detect tampering with the data. In some embodiments, various components may be simplified or merged into the controller core 302.

Configuration data of the configuration bitstream is generally loaded into and read from the configuration memory in frames, as will be described in more detail in reference to FIG. 4. As set forth above in reference to FIG. 3, a redundancy check may be performed based both upon the configuration bitstreams provided to the programmable integrated circuit as well as the configuration bits stored in and read back from configuration memory cells of the programmable integrated circuit. A redundancy check value may be inserted in one or more portions of the configuration bitstream. A redundancy check value is a number that is calculated from a bitstream or portion of a bitstream for the purpose of comparison with a recalculation by another component of a system to determine whether there are errors or intentional changes by an adversary accessing the bitstream. By way of example, the bitstream may be generated by a computer, such as the computer 102 of FIG. 1, which inserts a redundancy check value, as will be described in more detail in reference to FIG. 5, and then decoded by a device, such as a programmable integrated circuit coupled to receive the bitstream. One example is an ECC check. During readback of data stored in configuration memory, the ECC circuit 320 calculates a syndrome value using all of the bits in the frame including parity bits. If the bits have not changed from the original programmed values, all bits of the syndrome are zeros. If a single bit has changed, including any of the parity bits, an overall parity bit is a logical "1," and the location of the bit is indicated by all of the syndrome bits (except the most significant bit which is the overall parity bit). If two bits have changed, the most significant syndrome bit is a logical "0" and the remaining bits are non-zero. If more than two bits have changed, the syndrome bits are indeterminate. Accordingly, the overall parity bit enables the detection of two bit errors.

When implementing a CRC, the number of errors even greater than two can be identified. A CRC may be used to protect blocks of data or frames. In performing a CRC, a transmitter apends an extra n-bit sequence called a Frame Check Sequence (FCS) to every frame. The FCS holds redundant information about the frame that helps the receiver detect errors in the frame. While a CRC provides no indication as to the location of the errors, a CRC circuit may be used to provide additional information related to the number of errors that exist. For example, errors less than or equal to 32 can be detected using of a 32 bit running CRC. An example of a CRC generator is described in U.S. Pat. No. 5,598,424, granted on Jan. 28, 1997 to the assignee of the present application, the entire patent of which is also incorporated by reference. If an adversary changes the bits of an encrypted instruction in an attempt to alter a bitstream to avoid detection of the attack, the CRC will change based on the random bits. The adversary will be unable to fix the CRC except by trial and error. While a CRC may be used to protect frames of data, a CRC may be used according to various embodiments set forth below based upon one or more instructions. As each frame of a configuration bitstream is read, the CRC and ECC interfaces are monitored. In the event of an error, the controller core 302 provides an indication of an error and determines what, if any, action should be taken in response.

For loading configuration data in a programmable integrated circuit, the configuration controller 210 receives the configuration bitstream, and disperses frames of configuration bits of the configuration bitstream to various configuration memory cells according to a predetermined protocol. In the event of an error, the controller core 302 uses the output of the ECC circuit 320 to determine whether an error is a single-bit or a double-bit error. In the event of a single-bit error, a syndrome generated by the ECC circuit 320 can be used to repair the errors of the stored frame. The repaired frame can then be written back through configuration interface to the configuration memory 208.

While two specific types of redundancy checks, ECC and CRC are described, other redundancy checks such as horizontal redundancy checks and vertical redundancy checks could be employed. Further, the methods of the present invention could be implemented with portions of data other than a frame of configuration bits. As will be described in more detail below, a redundancy check may be implemented with a smaller unit than a frame of configuration bits, such as one instruction of a plurality of instructions for loading the configuration bits. However, it should still be understood that a frame ECC performed after a readback of configuration data could still be performed in conjunction with a CRC or other redundancy check performed with instructions, as set forth in more detail below. Accordingly, before specifically addressing the CRC checks associated with instructions, the operation of loading configuration bits will be described in reference to FIG. 4

Figure 4:
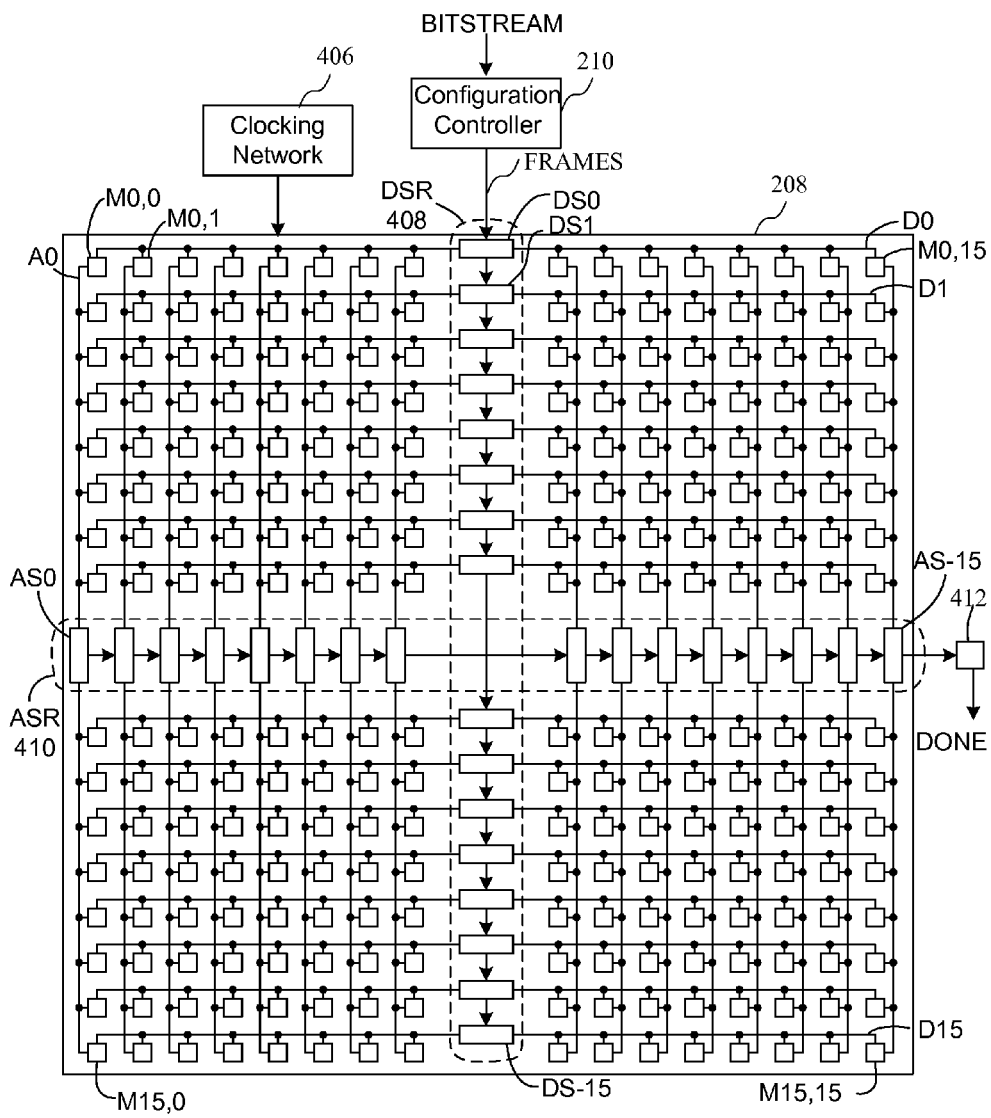
FIG. 4 is a block diagram of a circuit enabling the configuration of a device having programmable resources according to an embodiment.

Turning now to FIG. 4, a block diagram of a circuit enabling the configuration of a programmable integrated circuit, and more particularly loading frames of data, according to an embodiment is shown. The circuit of FIG. 4 generally comprises the configuration controller 210 and the configuration memory 108 coupled to receive the configuration bits. The configuration controller 210 receives the bitstream, and disperses frames of configuration bits of the bitstream to various configuration memory cells according to a predetermined protocol using a clocking network 406. The configuration controller 210 enables loading the configuration bitstream by way of a central data shift register (DSR) 408. DSR 408 is a length of a frame of configuration data, which will be the fundamental data item transferred. As shown in FIG. 4, the DSR 408, which is connected in parallel to all cells of the configuration memory, captures a frame. The DSR 408 outputs connect to the parallel inputs of the various configuration memory cells in the rows. The configuration process enables extracting frames of data from the incoming bitstream, identifying the correct columns to receive the frames, dispatching them until all of the frames have been loaded.

The configuration memory 208 is shown by way of example in FIG. 4 as a 16-bit by 16-bit array, which includes 256 configuration memory cells. In general, each of the configuration memory cells is identified by a reference character Mx,y, where x and y correspond to the row and column, respectively, of the configuration memory cell. To load configuration data into the configuration memory 404, the configuration bitstream is shifted through the DSR 408 under control of the clocking network 406 until a 16 bit wide frame of data has been shifted into bit positions DS0 through DS15 of the DSR 408. The frame of data is then shifted in parallel on data lines D0 through D15 into a column of configuration memory cells addressed by address shift register (ASR) 410. The column may be addressed, for example, by shifting a token high bit through the ASR 410 to the desired column. When all of the frames have been loaded, a circuit 412 is activated to generate the DONE signal. The DSR 408 and ASR 410 which are shown circled in dashed lines and the circuit 412 may be a part of the configuration controller 210. An array of configuration memory cells in a typical device has on the order of millions of memory cells. Therefore, the array of FIG. 4 is much smaller than is typically used, but nevertheless shows the structure of an array of memory cells of a configuration memory which could be employed according to the various embodiments. However, it should be understood that other arrangements of memory cells or circuits for loading configuration data in memory cells could be employed.

Figure 5:
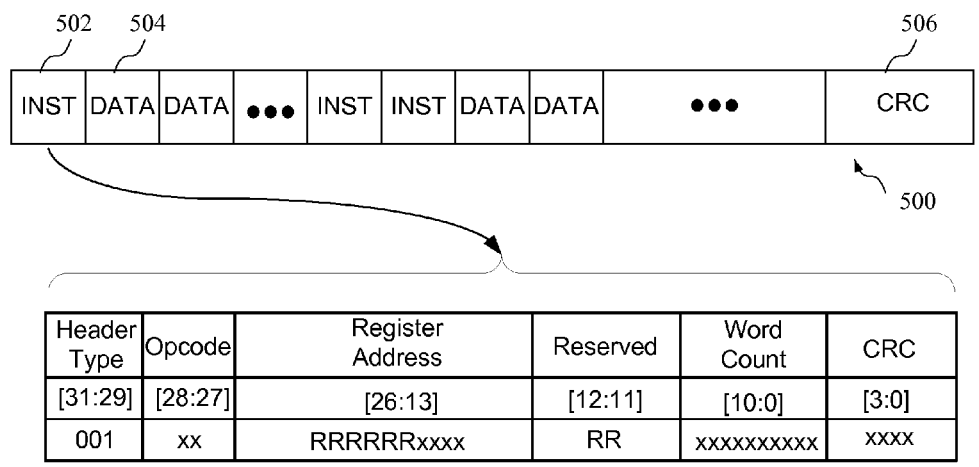
FIG. 5 shows a header for data bits to be loaded into a programmable integrated circuit according to an embodiment.

Turning now to FIG. 5, a header for data bits to be loaded into an integrated circuit according to an embodiment is shown. In particular, a configuration bitstream 500 comprises a plurality of instructions blocks 502 and data blocks 504, as well as an overall CRC block 506. The various portions of an instruction block 502 are shown in expanded form below the bitstream. Bitstream instructions for a programmable integrated circuit may be 32-bits or 64-bits long, for example, where not every bit is used.

As will be described in more detail below, a data integrity check such as a CRC, can be used to detect changes to the bitstream. This can catch changed bits from a bit-flipping attack. However, a simple data integrity check such as a CRC is computed using a simple algorithm. An adversary can flip bits in a CRC to adjust the CRC to match the changes to the data. One modification which an adversary may make is to initiate a readback of data which would expose the entire decrypted bitstream to the adversary.

Because a bit-flipping attack only works if the adversary knows the actual plaintext associated with a bitstream, it is possible to defeat a bit-flipping attack by introducing random bits. To use a data integrity check, which is low-cost and easy way to detect tampering with the data of a configuration bitstream, it is necessary to insert data into the bit stream that the adversary cannot control. That is, bits can be inserted into the bitstream to create randomness in the bit stream. The random bits introduced when generating a bitstream make it more difficult for an adversary to modify the bitstream as desired by the adversary, or adjust a redundancy check value to accommodate for changes made by the adversary. According to one embodiment, random values may be inserted in unused bits of bitstream, and particularly unused bits of instructions of the bitstream. As will be described in more detail below, the bits inserted to create randomness may be inserted in portions of an instruction header, or portions of data fields associated with a header.

When building a secure bit stream according to various embodiments set forth below, encoding software may insert random numbers in these unused bit locations. The data stored in the unused bit locations is ignored during instruction processing by the programmable integrated circuit, but contribute to a redundancy check value.

FIG. 5 shows a header having various fields, including a Header Type field, an Opcode field, a Register Address field, a Reserved field, a Word Count field, and a CRC field. While a CRC field enabling a CRC operation is included by way of example, it should be understood that other redundancy checks could be used in connection with the loading of data in the programmable integrated circuit. According to the embodiment of FIG. 5, the reserve bits of the Address Register field, designated by an "R," could be filled with random data bits. The decoder of the programmable integrated circuit coupled to receive a configuration bitstream would ignore the reserve bits of the address when decoding the address. If there are not enough unused bits in a given instruction, a no operation (NOP) instruction can be defined with unused bits in the reserved and word count fields. Other fields may be used, if available.

The random bits may be generated by a random bit generator, or some propriety algorithm for generating the random bits. Alternatively, the random bits may be generated by a CRC of data in other portions of the bitstream, such as other portions of the instruction. For example, random bits inserted in the Register Address field may be generated by a CRC of the data in the Count field. While various fields of the header are shown in FIG. 5, it should be understood that other fields of the header could be used for random bits, assuming that those bits are unused, or other headers having different fields than those shown in FIG. 5 could be used. The header of FIG. 5 is shown to provide examples of unused bits for which random bits could be inserted.

According to the embodiment of FIG. 5, the CRC field may be provided with each instruction, and a CRC is performed by the programmable integrated circuit when the configuration bitstream is received by the programmable integrated circuit. That is, the programmable integrated circuit may be implemented to perform a CRC check for each instruction. Alternatively, a CRC check may be performed after a predetermined number of instructions. Accordingly, data in the CRC field may relate to and only be used with the predetermined number of instructions, such as four instructions for example. According to another embodiment, as will also be described in more detail below, a CRC check may be performed only in response to an instruction to perform a CRC check. That is, rather than implement a programmable integrated circuit to perform a CRC check with each instruction or after a predetermined number of instructions, an instruction may be provided to instruct the programmable integrated circuit to perform a CRC check at a predetermined time during the loading of the configuration bitstream.

According to an alternate embodiment, randomness may be introduced into a bitstream by using multiple encodings for instructions. Typically, each instruction of a bitstream to be provided to a given programmable integrated circuit has a single encoding for the type of instruction. For example, considering the Opcode field of FIG. 5, an NOP instruction may be designated by "00," a read instruction may be designated by "01," and a write instruction may be designated by "10." However, as should be apparent, a designation of "11" in the Opcode field would be undefined. Rather than indicating an error when "11" is in the Opcode field, "11" may also be used to designate a write instruction. Accordingly, when constructing a bit stream, the software implementing the methods set forth below will encode a write instruction as "10" in some instances, and as "11" in other instances. By using multiple encodings for an instruction, an adversary would have a difficult time deciphering the data in the bistream.

According to a further embodiment, data in certain fields may be encoded, where one of the multiple encodings will indicate the encoding. For example, when "10" is provided in the Opcode field to designate a write instruction, the address data in the Address field is provided in its normal format. However, when "11" is provided in Opcode field to designate a write instruction, the address data in the address field may be modified. For example, the address data may be provided in reverse order, each bit may be inverted, or the data may be modified in some other known way. When the programmable integrated circuit receives a header for a write instruction having 11 in the Opcode field, the received address with be decoded to restore the original address. While the example above describes changing only one bit of a single instruction, multiple bits could be changed in multiple instructions as will be described in more detail below.

The instruction field may be enlarged to add additional commands, and are not limited to only two bits for an instruction. The encoding software which encodes the bitstream can use an algorithm for selecting which encoding to use, such as a pseudo random number generator or some proprietary algorithm for encoding instructions. Further, when implementing multiple encoded values, the encoding software could ensure that two instructions in a row never have the same encoding. The multiple encodings of instructions may be chosen to make it as difficult as possible for an adversary to guess the change. This could be done by choosing multiple encodings that differ in as many bits as possible, leading to a very different encoding than an encoding merely based upon flipping a bit of a field.

Implementing multiple encoding could be applied to other fields in the instruction. For example, if an instruction header has an address field having more bits than are required to address the available registers, multiple addresses could map to a single register. By allowing several different addresses to map to the same register, it is possible to introduce randomness in the Address Register field.

The randomness can also be applied to data fields. For example, the result written to a register could be the OR or XOR or AND of two different bits in the word. The different instruction encodings can accept different register encodings or different bit orderings. For example, one register encoding may first rotate the bits in the word to be written, and then write them.

Figure 6:
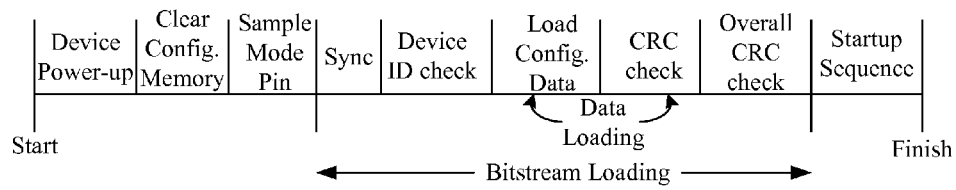
FIG. 6 is a diagram showing stages of configuring a programmable integrated circuit device having programmable resources according to an embodiment.

Turning now to FIG. 6, a diagram shows stages of configuring a programmable integrated circuit device having programmable resources according to an embodiment. At power up, the various configuration memory cells and state machines are not capable of correct electronic action until sufficient voltage and current are available from external power regulators. Depending on the integrated circuit, the precise voltages will be different for the various activities. In general, there is a recognition voltage where internal state machines trigger and take appropriate action. Once the proper voltage arrives, a state machine triggers and the configuration circuit automatically cycles through its address space of configuration frames, writing zeroes into all the memory cells during a Power-On Reset (POR). Zeroing the memory cells eliminates the possibility of internal contention, which might damage the integrated circuit. Zeroing the memory cells may be performed twice to assure proper initialization. After zeroing the memory cells of the configuration memory, the configuration memory samples mode pins to continue the configuration process according to a selected mode of configuration.

The configuration bitstream includes a synchronization word to guarantee correct reading of the synchronization data at a previously specified clock period. If synchronization word is read correctly, it is necessary to ensure that the bits which follow are for the receiving integrated circuit. Therefore, a device ID is next checked. For example, the device ID may be checked against an ID stored in the programmable integrated circuit. The ID may be specific to a specific device, a type of device, or even a family of devices. Because frame sizes and bit arrangements may vary among different devices in a family of devices, this check is critical to ensure that data frames are not inadvertently loaded into the wrong device.

Figure 7:
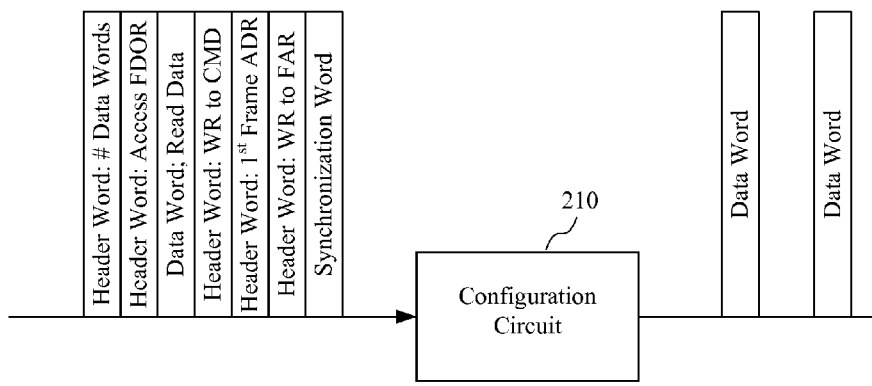
FIG. 7 is a diagram showing the generation of data words from a configuration bitstream according to an embodiment.

Assuming synchronization and device ID check are satisfied, the configuration payload is then loaded. The configuration payload bits include not only the configuration data (e.g. the bits which are used to configure CLBs, BRAMs, etc.), but also instructions and parameters for a set of specific actions that the configuration circuit must take to load the configuration data. As shown in FIG. 7, both control words (i.e. instructions) and data words are provided in the configuration payload to enable the correct loading of the frames of data in the configuration memory 208.

Through the duration of bitstream delivery, a CRC state machine within the integrated circuit tallies a finite field calculation that is unique for the delivered bitstream or portion of the bitstream. As described above, a CRC check may be performed periodically during the loading of the bitstream, as indicated by the "Data Loading" designation and corresponding arrows in FIG. 6. For example, a CRC check may be performed on every instruction, after a predetermined number of instructions, or in response to an instruction which requests that a CRC check be performed. After all of configuration bits are loaded, an overall CRC check may be performed using data in the CRC field 506, where the integrated circuit calculated CRC value must match the one appended to the bitstream at the end of the process. If any CRC value calculated during the loading of the bitstream or the overall CRC value fails to match a corresponding CRC value provided with the bitstream, an error condition is flagged into a configuration controller error register. If the CRC values match, an active high DONE signal is generated to indicate that all of the configuration bits have been successfully loaded.

Figure 8:
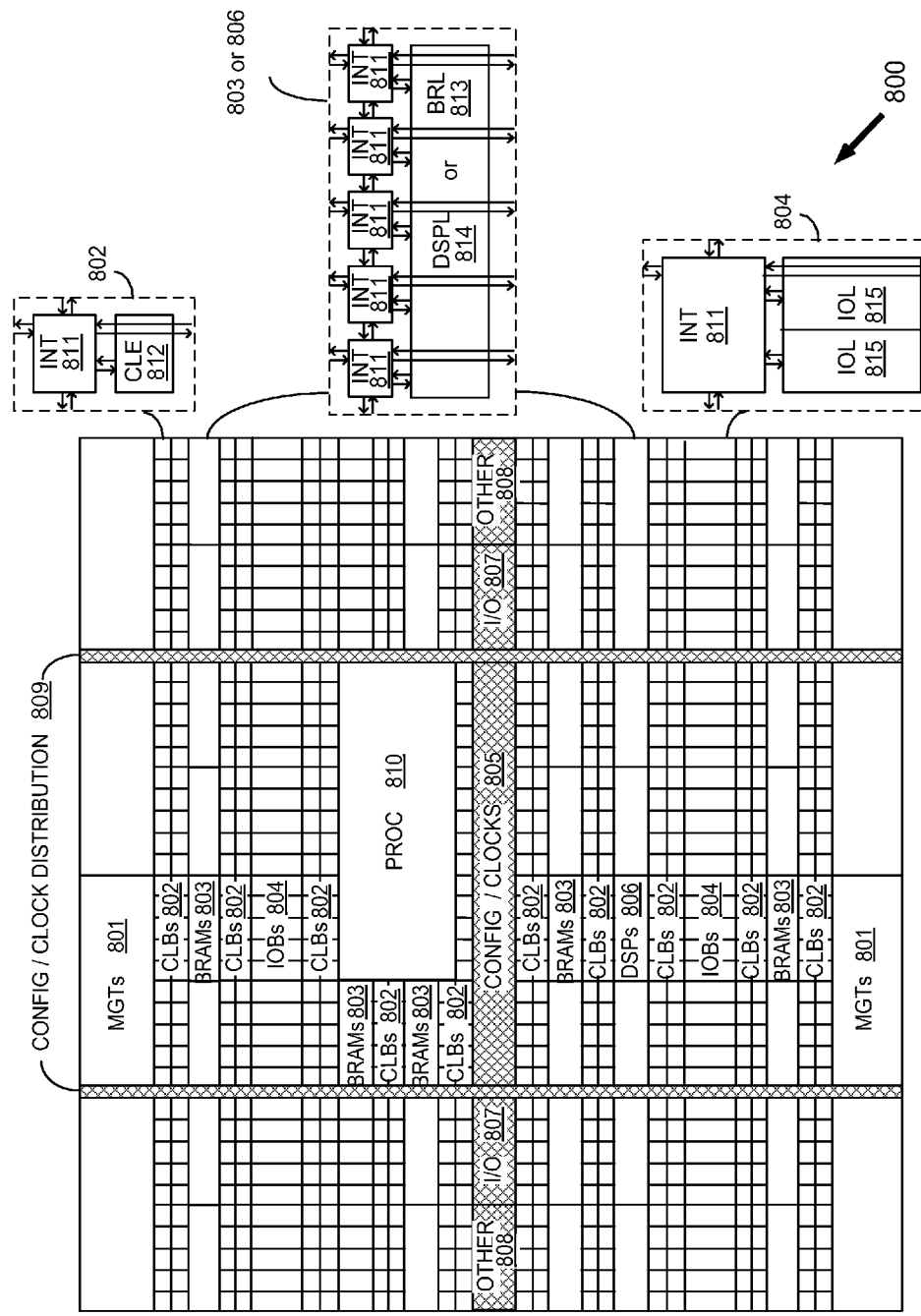
FIG. 8 is a block diagram of a programmable integrated circuit device having programmable resources according to an embodiment.

Turning now to FIG. 8, a block diagram of a device having programmable resources according to an embodiment is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., flash memory, as in some CPLDs), or in any other type of memory cell.

The device of FIG. 8 comprises an FPGA architecture 800 having a large number of different programmable tiles including multi-gigabit transceivers (MGTs) 801, CLBs 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807 (e.g., configuration ports and clock ports), and other programmable logic 808 such as digital clock managers, analog-to-digital converters, system monitoring logic, and so forth. Some FPGAs also include dedicated processor blocks (PROC) 810, which may be used to implement a software application, for example.

In some FPGAs, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA. The programmable interconnect element 811 also includes the connections to and from the programmable logic element within the same tile, as shown by the examples included at the top of FIG. 8.

For example, a CLB 802 may include a configurable logic element (CLE) 812 that may be programmed to implement user logic plus a single programmable interconnect element 811. A BRAM 803 may include a BRAM logic element (BRL) 813 in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as five CLBs, but other numbers may also be used. A DSP tile 806 may include a DSP logic element (DSPL) 814 in addition to an appropriate number of programmable interconnect elements. An IOB 804 may include, for example, two instances of an input/output logic element (IOL) 815 in addition to one instance of the programmable interconnect element 811. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die is used for configuration, clock, and other control logic. Horizontal areas 809 extending from this column are used to distribute the clocks and configuration signals across the breadth of the FPGA. Some FPGAs utilizing the architecture illustrated in FIG. 8 include additional logic blocks that disrupt the regular columnar structure making up a large part of the FPGA. The additional logic blocks may be programmable blocks and/or dedicated logic. For example, the processor block PROC 810 shown in FIG. 8 spans several columns of CLBs and BRAMs.

Note that FIG. 8 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual FPGA more than one adjacent column of CLBs is typically included wherever the CLBs appear in order to facilitate the efficient implementation of user logic.

Figure 9:
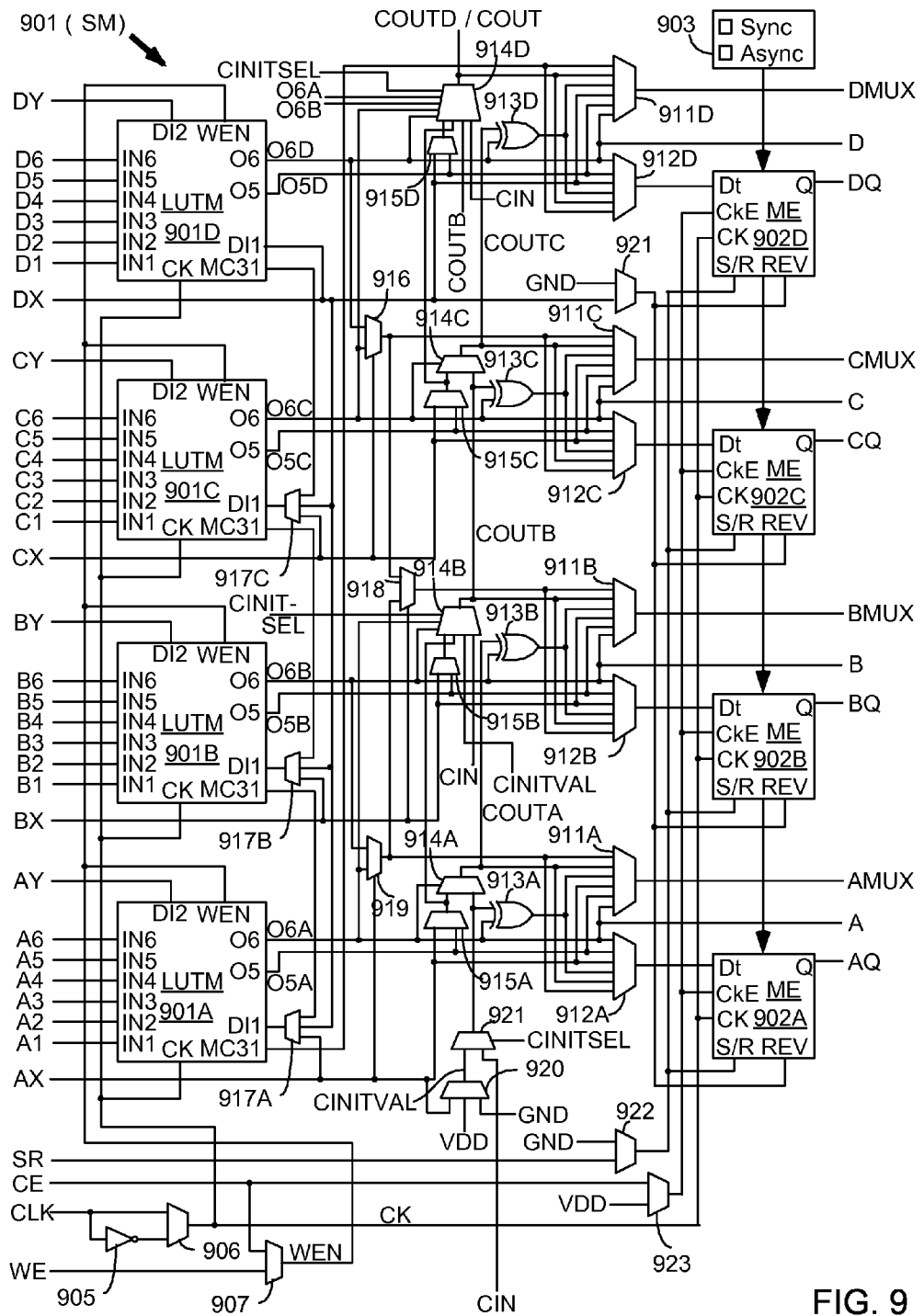
FIG. 9 is a block diagram of a configurable logic element according to an embodiment.

Turning now to FIG. 9, a block diagram of a configurable logic element according to an embodiment is shown. In particular, FIG. 9 illustrates in simplified form a configurable logic element of a configuration logic block 802 of FIG. 8. In the embodiment of FIG. 9, slice M 901 includes four lookup tables (LUTMs) 901A-901D, each driven by six LUT data input terminals A1-A6, B1-B6, C1-C6, and D1-D6 and each providing two LUT output signals O5 and O6. The O6 output terminals from LUTs 901A-901D drive slice output terminals A-D, respectively. The LUT data input signals are supplied by the FPGA interconnect structure via input multiplexers, which may be implemented by programmable interconnect element 911, and the LUT output signals are also supplied to the interconnect structure. Slice M also includes: output select multiplexers 911A-911D driving output terminals AMUX-DMUX; multiplexers 912A-912D driving the data input terminals of memory elements 902A-902D; combinational multiplexers 916, 918, and 919; bounce multiplexer circuits 922-923; a circuit represented by inverter 905 and multiplexer 906 (which together provide an optional inversion on the input clock path); and carry logic having multiplexers 914A-914D, 915A-915D, 920-921 and exclusive OR gates 913A-913D. All of these elements are coupled together as shown in FIG. 9. Where select inputs are not shown for the multiplexers illustrated in FIG. 9, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 9 for clarity, as well as from other selected figures herein.

In the pictured embodiment, each memory element 902A-902D may be programmed to function as a synchronous or asynchronous flip-flop or latch. The selection between synchronous and asynchronous functionality is made for all four memory elements in a slice by programming Sync/Asynch selection circuit 903. When a memory element is programmed so that the S/R (set/reset) input signal provides a set function, the REV input terminal provides the reset function. When the memory element is programmed so that the S/R input signal provides a reset function, the REV input terminal provides the set function. Memory elements 902A-902D are clocked by a clock signal CK, which may be provided by a global clock network or by the interconnect structure, for example. Such programmable memory elements are well known in the art of FPGA design. Each memory element 902A-902D provides a registered output signal AQ-DQ to the interconnect structure. Because each LUT 901A-901D provides two output signals, O5 and O6, the LUT may be configured to function as two 5-input LUTs with five shared input signals (IN1-IN5), or as one 6-input LUT having input signals IN1-IN6.

In the embodiment of FIG. 9, each LUTM 901A-901D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 917A-917C for LUTs 901A-901C), or to the two 32-bit RAMs via input terminals DI1 and DI2. RAM write operations in the LUT RAMs are controlled by clock signal CK from multiplexer 906 and by write enable signal WEN from multiplexer 907, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 901A may also be provided to the general interconnect structure for shift register chaining, via output select multiplexer 911D and CLE output terminal DMUX. Accordingly, the methods may be implemented in a device such as the FPGA of FIGS. 8 and 9, or any other suitable device.

Figure 10:
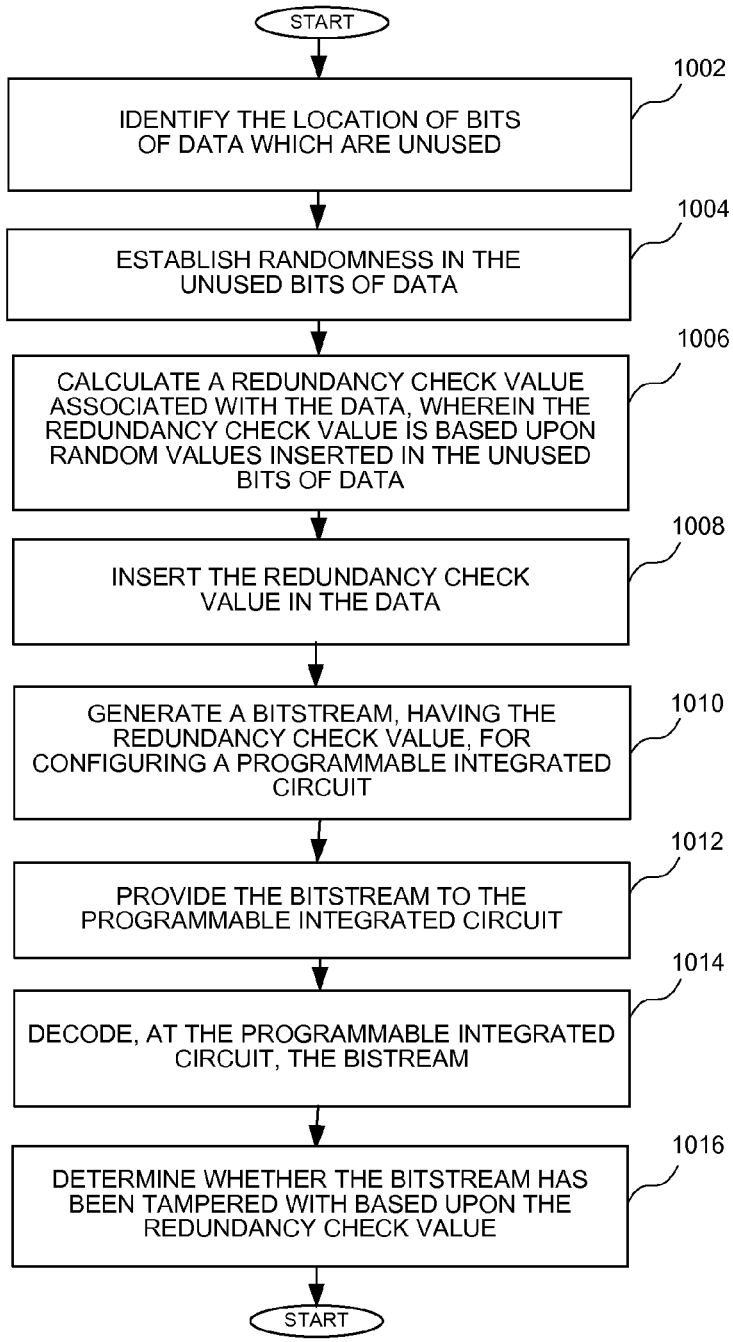
FIG. 10 is a flow chart showing a method of detecting a tampering with data adapted to program a programmable integrated circuit according to an embodiment.

Specific methods according to various embodiments will now be described in reference to FIGS. 10-15. The methods may be performed using the various circuits and systems set described above, and particularly the computer 102 as described, or using other suitable circuits and systems. As should be apparent, additional steps of the methods (or additional details related to the steps) may be performed by a computer according to various embodiments of FIGS. 1-9 as described above. Turning first to FIG. 10, a flow chart shows a method of detecting a tampering with data adapted to program a programmable integrated circuit according to an embodiment. The location of bits of data which are unused are identified at a step 1002. Randomness in the bitstream is established by inserting arbitrary bit values in the unused bits of data at a step 1004. A redundancy check value associated with the data is calculated at a step 1006, wherein the redundancy check value is based upon random values inserted in the unused bits of data. The redundancy check value may also be based on non-random parts of the data. The redundancy check could be, for example, a CRC value. The redundancy check value is inserted in the data at a step 1008. As set forth in more detail above, multiple redundancy check values can be inserted in a bitstream. For example, the redundancy check value could be inserted in each instruction, or at a predetermined instruction in a series of instructions. An overall redundancy check value could also be inserted at the end of a bitstream. A bitstream having the redundancy check value is generated for configuring a programmable integrated circuit at a step 1010. The bitstream is provided to the programmable integrated circuit at a step 1012. The bitstream is then decoded at the programmable integrated circuit at a step 1014. It is then determined whether the bitstream has been tampered with based upon the redundancy check value at a step 1016. That is, a redundancy value calculated by the programmable integrated circuit is compared to a transmitted value to determine whether the bitstream has been tampered with.

Figure 11:
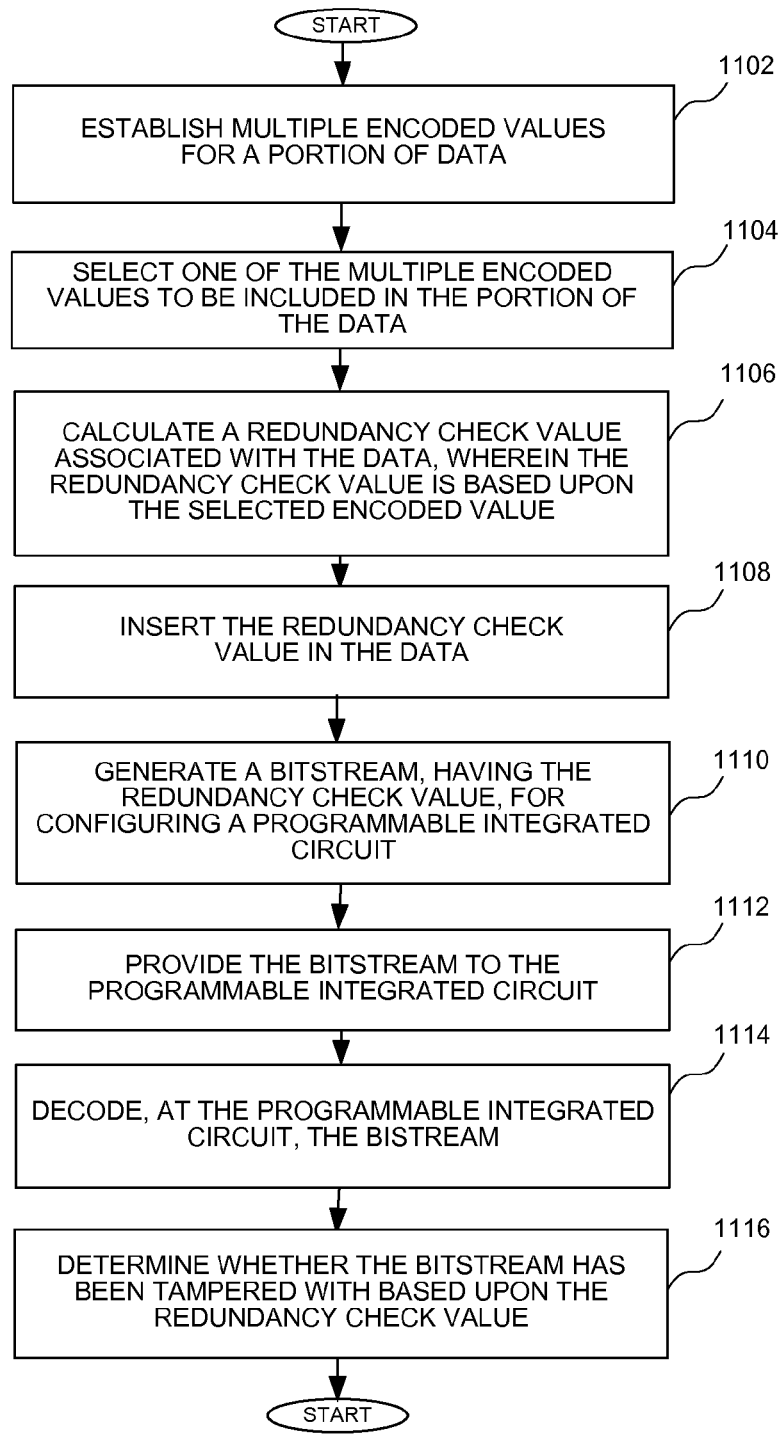
FIG. 11 is a flow chart showing a method of detecting a tampering with data adapted to program a programmable integrated circuit based upon multiple encoded values according to an embodiment.

Turning now to FIG. 11, a flow chart shows a method of detecting a tampering with data adapted to program a programmable integrated circuit based upon multiple encoded values according to an embodiment. Multiple encoded values are established for a portion of data at a step 1102. The multiple encoded values may be, for example, multiple bits patterns which could be included in an Opcode field for a read or write instruction. One of the multiple encoded values is selected to be included in the portion of the data at a step 1104. A redundancy check value associated with the data is calculated at a step 1106, wherein the redundancy check value is based upon the selected encoded value. The redundancy check value may also be based on parts of the data besides the selected encoded value. The redundancy check value is inserted in the data at a step 1108. A bitstream having the redundancy check value for configuring a programmable integrated circuit is generated at a step 1110. The bitstream is provided to the programmable integrated circuit at a step 1112. The bitstream is decoded at the programmable integrated circuit at a step 1114. When decoding the bitstream, the programmable integrated circuit performs the instructions based upon the multiple encoded values. It is then determined whether the bitstream has been tampered with based upon the redundancy check value at a step 1116.

Figure 12:
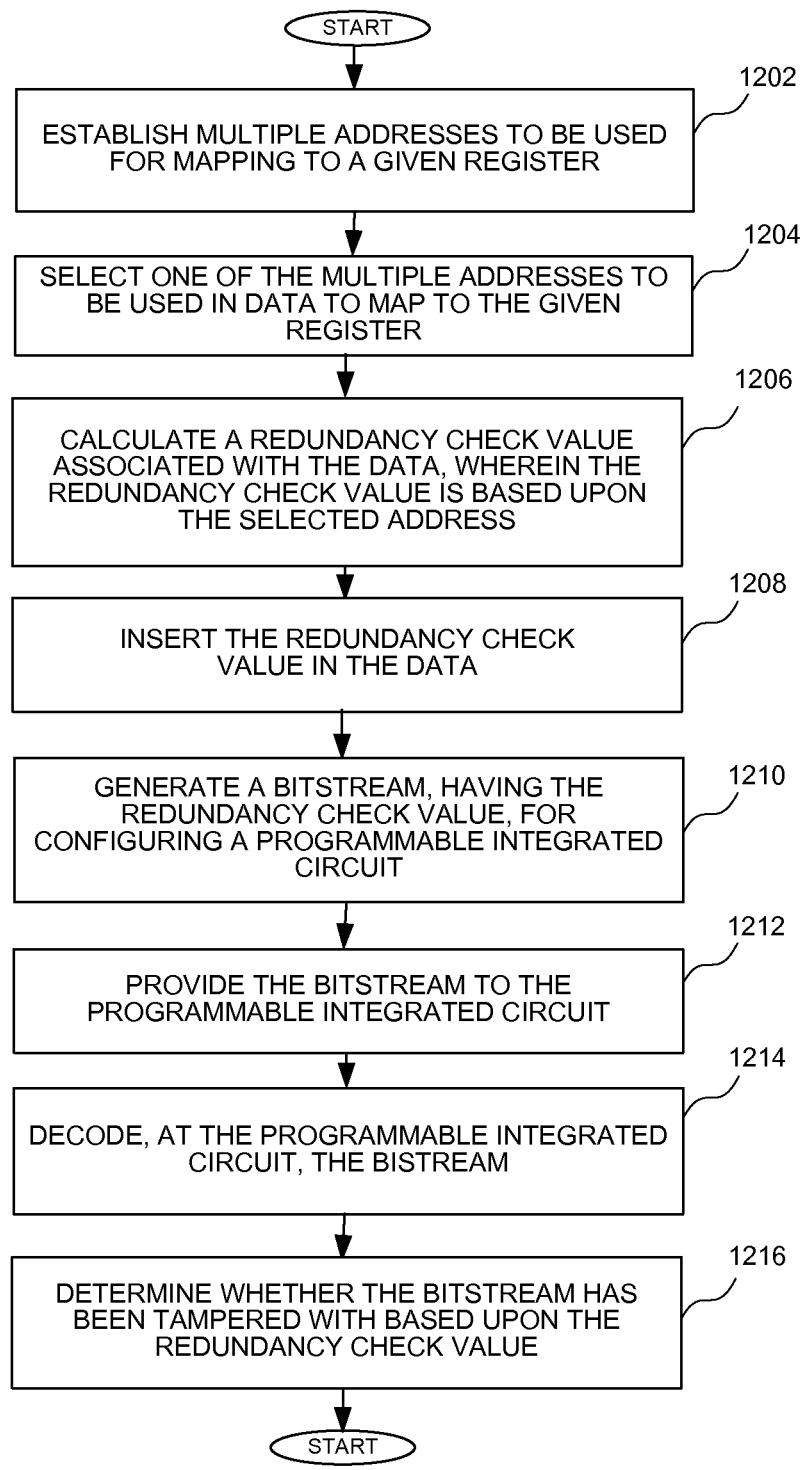
FIG. 12 is a flow chart showing a method of detecting a tampering with data adapted to program a programmable integrated circuit based upon multiple addresses for mapping to a given register according to an embodiment.

Turning now to FIG. 12, a flow chart shows a method of detecting a tampering with data adapted to program a programmable integrated circuit based upon multiple addresses for mapping to a given register. Multiple addresses to be used for mapping to a given register are established at a step 1202. One of the multiple addresses is selected at a step 1204. A redundancy check value associated with the data is calculated at a step 1206, wherein the redundancy check value is based upon the selected address. The redundancy check value may also be based on parts of the data besides the selected address. The redundancy check value is inserted in the data at a step 1208. A bitstream having the redundancy check value for configuring a programmable integrated circuit is generated at a step 1210. The bitstream is provided to the programmable integrated circuit at a step 1212. The bitstream is decoded at the programmable integrated circuit at a step 1214. When decoding the bistream, the programmable integrated circuit decodes the addresses based upon the mapping of multiple addresses for a given register as described above. It is then determined whether the bitstream has been tampered with based upon the redundancy check value at a step 1216.

Figure 13:
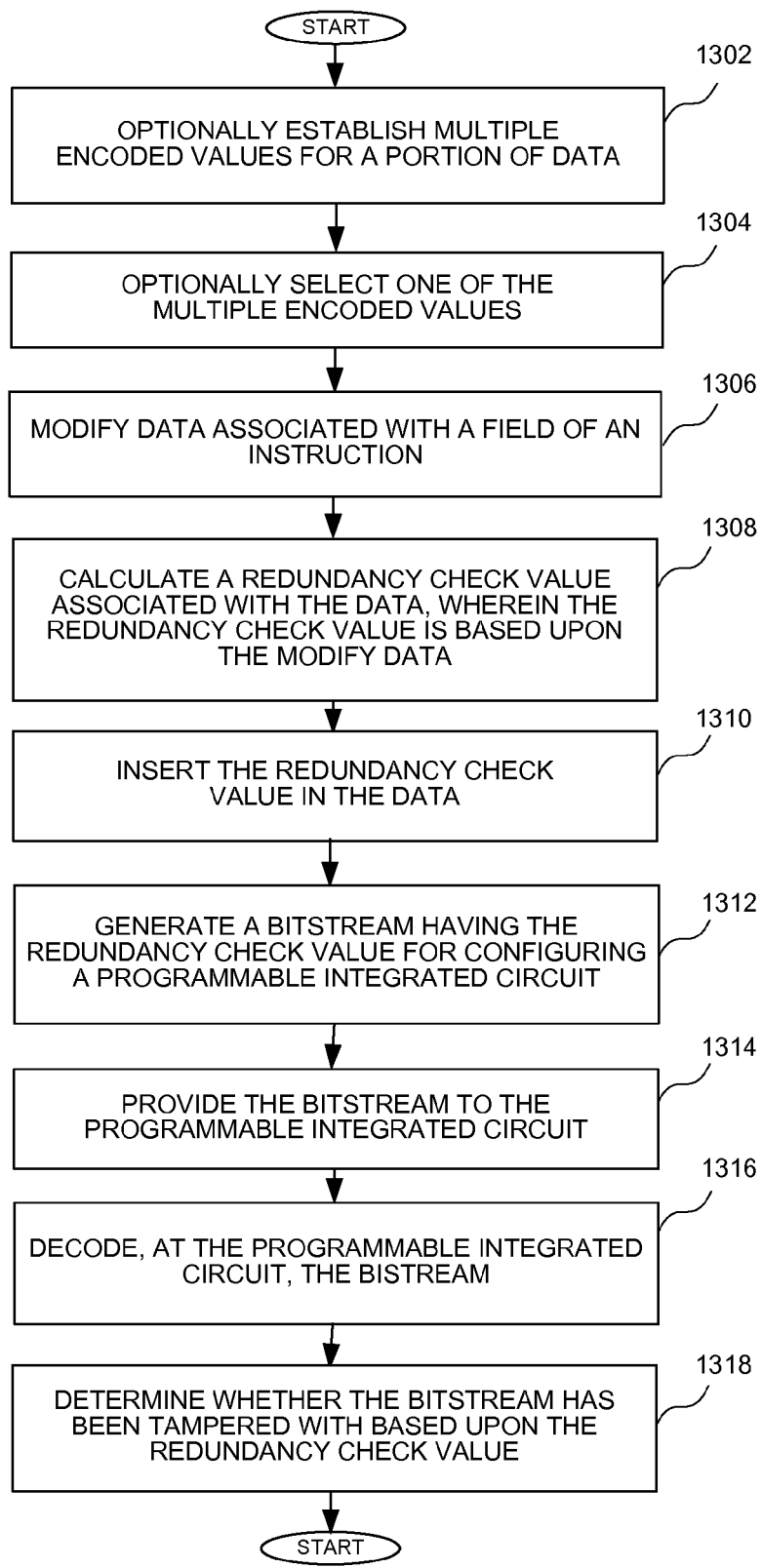
FIG. 13 is a flow chart showing a method of detecting a tampering with data adapted to program a programmable integrated circuit based upon modified data associated with a field of an instruction according to an embodiment.

Turning now to FIG. 13, a flow chart shows a method of detecting a tampering with data adapted to program a programmable integrated circuit based upon modified data associated with a field of an instruction according to an embodiment. Multiple encoded values are optionally established for a portion of data at a step 1302. One of the multiple encoded values is optionally selected to be included in the portion of the data at a step 1304. The multiple encoded data may be used to indicate whether certain data is encoded and how it is encoded. While the encoding alone will establish randomness in the bit pattern, the optional use of multiple encoded values for a portion of the data enables another layer of encoding. For example, one multiple encoded values in an Opcode field may be used to indicate that data in an address field is encoded, while another encoded value may be used to indicate that data in an address field is not encoded as described above.

Data associated with a field of an instruction is encoded as desired at a step 1306. For example, address data in an address field may be encoded according to a predetermined protocol. A redundancy check value associated with the data is calculated at a step 1308, wherein the redundancy check value is based upon the selected address. The redundancy check value may also be based on parts of the data besides the selected address. The redundancy check value is inserted in the data at a step 1310. A bitstream having the redundancy check value for configuring a programmable integrated circuit is generated at a step 1312. The bitstream is provided to the programmable integrated circuit at a step 1314. The bitstream is decoded at the programmable integrated circuit at a step 1316. It is then determined whether the bitstream has been tampered with based upon the redundancy check value at a step 1318.

Figure 14:
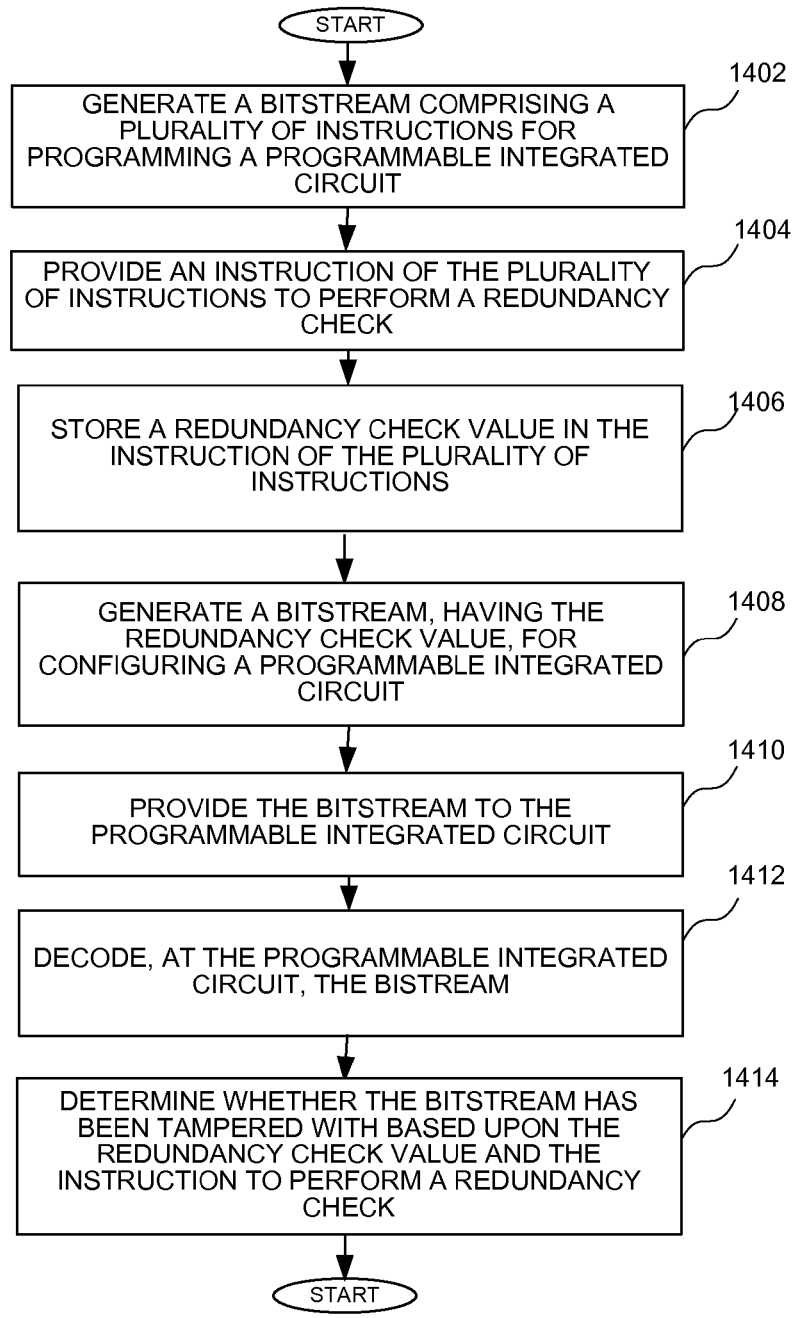
FIG. 14 is a flow chart showing a method of detecting a tampering with data adapted to program a programmable integrated circuit in response to an instruction provided to the programmable integrated circuit according to an embodiment.

Turning now to FIG. 14, a flow chart shows a method of detecting a tampering with data adapted to program a programmable integrated circuit in response to an instruction provided to the programmable integrated circuit according to an embodiment. A bitstream comprising a plurality of instructions for programming a programmable integrated circuit is generated at a step 1402. An instruction of the plurality of instructions to perform a redundancy check is provided at a step 1404. A redundancy check value is stored in the instruction of the plurality of instructions at a step 1406. A bitstream having the instruction and redundancy check value for configuring a programmable integrated circuit is generated at a step 1408. The bitstream is provided to the programmable integrated circuit at a step 1410. The bitstream is decoded at the programmable integrated circuit at a step 1412. It is then determined whether the bitstream has been tampered with based upon the redundancy check value at a step 1414.

Figure 15:
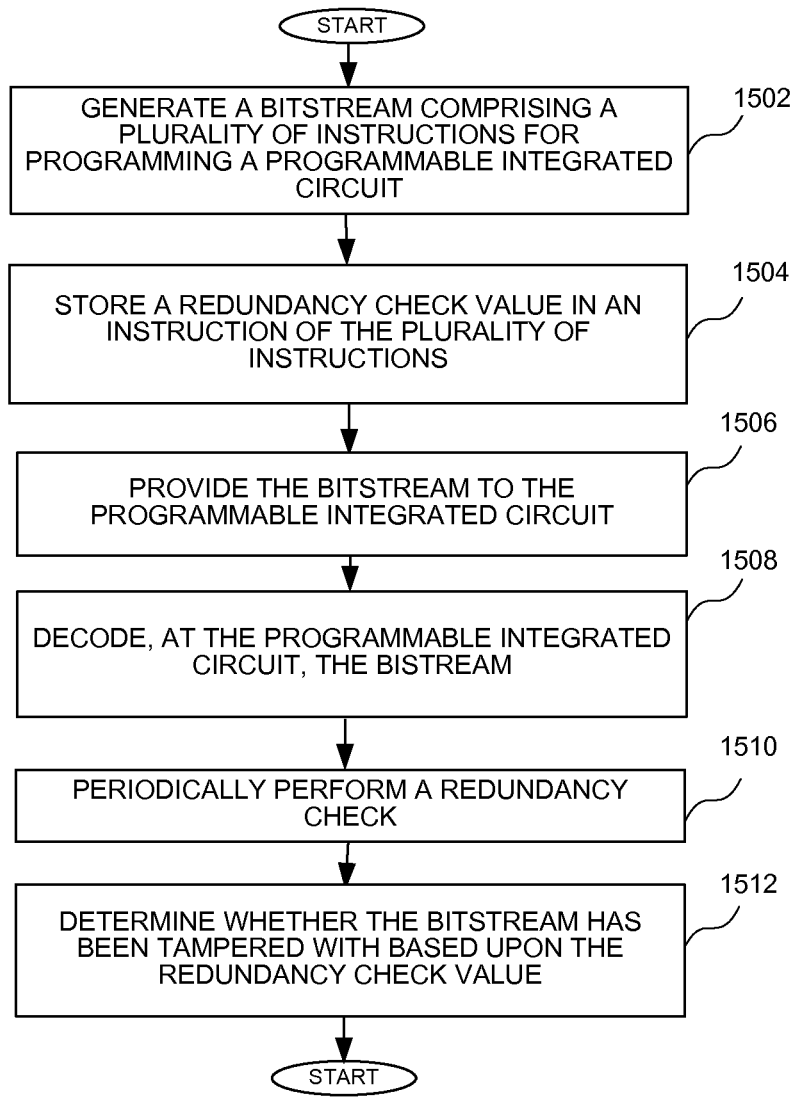
FIG. 15 is a flow chart showing a method of detecting a tampering with data adapted to program a programmable integrated circuit periodically by the programmable integrated circuit according to an embodiment.

Turning now to FIG. 15, a flow chart shows a method of detecting a tampering with data adapted to program a programmable integrated circuit periodically by the programmable integrated circuit according to an embodiment. A bitstream comprising a plurality of instructions for programming a programmable integrated circuit is generated at a step 1502. A redundancy check value is stored in an instruction of the plurality of instructions at a step 1504. The bitstream is provided to the programmable integrated circuit at a step 1506. The bitstream is decoded at the programmable integrated circuit at a step 1508. A redundancy check is periodically performed at a step 1510. For example, a redundancy check could be performed for every instruction or after a predetermined number of instructions. It is then determined whether the bitstream has been tampered with based upon the redundancy check at a step 1512.

It can therefore be appreciated that the new and novel method of detecting a tampering with data adapted to program a programmable integrated circuit has been described. It will be appreciated by those skilled in the art that numerous alternatives and equivalents will be seen to exist which incorporate the disclosed invention. As a result, the invention is not to be limited by the foregoing embodiments, but only by the following claims.

I claim:

1. A method of enabling detection of tampering with data provided to a programmable integrated circuit, the method comprising:

generating a plurality of instructions, each instruction of the plurality of instructions having a plurality of fields for implementing the instruction, wherein a field of the plurality of fields may receive one of a plurality of encoded values for a particular instruction;

selecting an encoded value of the plurality of encoded values to be inserted in the field of an instruction to establish randomness in the instruction, wherein encoded values for two of the particular instruction in a row are selected to have different encoded values; and inserting, by a computer, a redundancy check value in the instruction, wherein the redundancy check value is based upon the selected encoded value of the plurality of encoded values.

2. The method of claim 1 further comprising performing, by the programmable integrated circuit, error detection using the redundancy check value.

3. The method of claim 2 wherein performing error detection comprises performing error detection for each instruction of the plurality of instructions in the data.

4. The method of claim 2 wherein performing error detection comprises performing error detection in response to an instruction to perform a redundancy check inserted in the plurality of instructions in the data.

5. The method of claim 1 further comprising encrypting the data.

6. The method of claim 1, wherein the modifying unused bits of a field of the plurality of fields of an instruction comprises:
- establishing multiple encoded values for the field of the instruction; and
- generating, by a computer, a bitstream having the selected encoded value for configuring the programmable integrated circuit.

7. The method of claim 6 wherein selecting an encoded value of the plurality of encoded values comprises selecting the encoded value at random.

8. The method of claim 6 wherein establishing multiple encoded values for the field of the instruction comprises establishing multiple encoded values for an operational code of the instruction.

9. The method of claim 8 wherein establishing multiple encoded values for the field of the instruction comprises establishing multiple encoded values for a write instruction, wherein one encoded value of the multiple encoded values indicates that data associated with the write instruction is encoded.

10. The method of claim 6 wherein establishing multiple encoded values for the field of the instruction comprises allowing multiple addresses of an address field to map to a given register.

11. The method of claim 6 further comprising inserting an error code value in an error code field of the instruction, wherein the error code value is based upon the selected encoded value.

* * * * *